Patented Dec. 18, 1945

2,391,189

UNITED STATES PATENT OFFICE 2,391,189

ISOMERIZATION PROCESS

Stephen F. Perry, Roselle, N. J., assignor to Standard Oil Development Company, a corporation of Delaware No Drawing. Application September 19, 1942, Serial No. 458,942

7 Claims. (Cl. 260—683.5)

The present invention is concerned with the isomerization of straight chain or normal paraffins containing at least four carbon atoms per molecule to produce the corresponding iso or branched chain paraffins by means of catalysts such as those of the Friedel-Crafts type, either in liquid or vapor phase and in the presence of promotional amounts of halogen-containing promoters such as, for example, hydrogen chloride, hydrogen bromide, chlorine, bromine, carbon tetrachloride, chloroform, the lower alkyl halides such as methyl, ethyl, propyl and butyl chlorides and bromides. Aluminum chloride is the most commonly employed catalyst, although the bromide may also be employed.

The isomerization process as above described has been carried out both in liquid and in vapor phase and aluminum chloride, either in granular or finely divided form or on porous carriers, has been the chief catalyst used. The carriers may be any number of different types such as activated clays, bauxite, Porocel, alumina gel, activated carbon, activated alumina, silica gel and the like. The present invention is directed to an improvement in such isomerization processes. More particularly, the invention relates to a continuous vapor phase isomerization process in which butane or pentane is passed in vapor phase at elevated temperatures and pressures through a bed of aluminum chloride sorbed in a partially dehydrated bauxite such as Porocel, the reaction being carried out in the presence of small amounts of hydrogen chloride. Such a process works very well and gives good yields of isobutane or isopentane, as the case might be, where the feed stocks are relatively pure hydrocarbons predominating in straight chain constituents to be isomerized, but oftentimes, particularly in refining operations, substantially pure paraffinic feed stocks are not to be found, and heretofore it has been found difficult to utilize all types of paraffinic feed stocks because of the presence of numerous impurities, among which may be mentioned the sulfur-containing impurities. A number of the crudes which are refined contain small amounts of elemental sulfur, mercaptans, hydrogen sulfide, carbon disulfide and various other organic sulfur-containing compounds. Conventional treating operations may be employed and are desirably employed to remove from refinery $C_4$ or $C_5$ cuts substantial amounts of these sulfur type impurities, but such treatments do not completely remove these impurities and hence even in the best treating operations some very small amounts of one or more of hydrogen sulfide, elemental sulfur, carbon disulfide, mercaptans and the like do remain in the feed stocks which otherwise would be suitable for direct processing in an isomerization unit.

It has been discovered, however, that in the absence of expedients such as those embodied in the present invention when these feed stocks which have been previously treated to remove the bulk of the sulfur impurities, but which do contain very small amounts of sulfur impurities after the treating operation, are employed in the continuous vapor phase commercial isomerization units of the type heretofore described that difficulties arise in the maintenance of this operation in refinery practice. One method of running these large continuous isomerization units using liquid phase operation has been found to be undesirable because of numerous plant shutdowns due to the formation of solid deposits in the various lines, valves, plates, etc., of the system. The fouling and plugging of these lines frequently necessitates the complete shutdown of the system and laborious and expensive cleaning of the various plugged and fouled product lines. It has heretofore been thought that the fouling of the product recovery system was due to the precipitation and deposits of aluminum chloride, but in the recently improved vapor phase operation the loss of aluminum chloride from the reaction catalyst mass ordinarily does not exceed 0.003 weight per cent of aluminum chloride, which is well below the determined solubility of aluminum chloride in liquefied iso or normal butane in the temperature range employed. But in spite of this, when running with a feed stock containing small amounts of sulfur type impurities, fouling and plugging of the lines eventually occurs. After careful investigation it was discovered that the deposited material was not aluminum chloride but was in fact a complex of aluminum chloride with hydrogen sulfide. This material has an extremely low solubility in liquid normal or iso butane and is formed by the contacting of very small amounts of hydrogen sulfide with aluminum chloride. This formation was observed even in feed stocks which contained as little as 96 grains of hydrogen sulfide per thousand cubic feed of paraffinic feed stock going to the isomerization unit, by reason of the fact that the hydrogen sulfide built up in the system because it was carried overhead with the hydrogen chloride promoter which was recycled to the isomerization unit after being removed from the product effluent and tended to increase and aggravate this formation of $AlCl_3.H_2S$ complex.

It is an object of the present invention to prevent the build-up of hydrogen sulfide in the isomerization system. It is a further object of the invention to prolong the isomerization catalyst life by minmizing the poisoning and removal of aluminum chloride from the isomerization catalyst mass due to its reaction with sulfur impurities. It is a further object of the invention to remove from the system hydrogen sulfide at convenient selected locations therein so as to prevent plugging and fouling of valves, pipes, plates and the like at inaccessible places in the system but to form complexes at these desirable locations so that they may be removed readily as solid complexes, without the attendant removal of large amounts of HCl. Other objects will be apparent upon a fuller understanding of the invention hereinafter more completely described.

Briefly, these objects are accomplished by the insertion into the recycle system of an isomerization unit of a chamber charged with aluminum chloride or with metallic copper in a suitable comminuted state. The overhead from the stripping of the reacted mixture, which is composed chiefly of hydrogen chloride but contains appreciable amounts of hydrogen sulfide, is first passed through this chamber wherein the hydrogen sulfide is reacted with the substances contained therein so that either a hydrogen chloride substantially completely free of hydrogen sulfide or a hydrogen chloride containing a reduced amount of hydrogen sulfide is recycled from the stripping operation to the isomerization catalyst zone during the isomerization reaction. It is not necessary to employ solely aluminum chloride or metallic copper. Any substance known to selectively react with hydrogen sulfide to form an insoluble reaction product therewith under these conditions may be likewise employed. However, these two substances have been found to be quite satisfactory in accomplishing the desired objects of the invention. By so locating the unit for the removal of hydrogen sulfide the net result is to get the hydrogen sulfide removed from the system at a readily accessible spot in preference to the formation of an insoluble complex or sulfide in inaccessible spots in the system such as in a product cooler, in a stripping tower, or in lines or valves connecting such pieces of equipment. Generally it is desirable to maintain a large body or bed of aluminum chloride or copper turnings, balls, pelletts, grindings, powder or the like through which the stripper gases pass, and if aluminum chloride is used it is likewise desirable to maintain the hydrogen sulfide removal means at a somewhat lower temperature than any existing in the product condenser or lines since it has been found that the hydrogen sulfide is more completely removed by means of aluminum chloride complex formation therewith at lower temperatures.

In place of using fresh aluminum chloride for the removal of hydrogen sulfide, spent or partially spent isomerization catalyst masses of aluminum chloride sorbed in Porocel type carrier may be employed in the removal of hydrogen sulfide from the stripped gas either with or without the addition of fresh quantities of aluminum chloride to the spent isomerization catalyst mass. By treating the hydrogen chloride recycle stream to remove the hydrogen sulfide therefrom, still another advantage accrues in the overall efficiency of the process by reason of the fact that the hydrogen sulfide partial pressure in the recycle stream is far greater than its partial pressure in the product effluent stream where butanes or other similar paraffins act as diluents to the hydrogen sulfide and hydrogen chloride. The hydrogen sulfide is therefore more completely and conveniently removed from the system than could be accomplished by treating the feed or product stream. In the operation of the hydrogen sulfide removal step it is only necessary to maintain conditions such as to take out enough hydrogen sulfide to maintain a substantially constant yet exceedingly low partial pressure of hydrogen sulfide in that stream and to correlate the hydrogen sulfide removal conditions with the conditions maintained in the product lines and equipment so as to prevent hydrogen sulfide complex formation with aluminum chloride in the product lines and to maximize the complex formation or reactant formation such as copper sulfide in the hydrogen sulfide removal step. Several of the heretofore mentioned expedients tend to accomplish this overall result.

In order to more fully understand the precise nature of the invention it might be pointed out that complexes of the hydrogen sulfide with aluminum chloride are known to exist in crystalline form and apparently they are similar in nature to the crystalline hydrates and have compositions ranging from $Al_2Cl_6.O.1H_2S$ up to as high as $Al_2Cl_6.2H_2S$. Usually the proportion of hydrogen sulfide contained is greater at lower temperatures and at higher partial pressures of hydrogen sulfide and this tends to give a preferential formation of $AlCl_3.H_2S$ complex in the recycle stream coming from the stripping tower back to the isomerization unit, particularly where the lower temperature is maintained in this removal drum. Once the complex is formed in the hydrogen sulfide removal step the $AlCl_3$ is no longer useful (until after regeneration) and it is necessary for free aluminum chloride to combine with further quantities of hydrogen sulfide in order to further remove the hydrogen sulfide from the recycle stream. If a particular batch of aluminum chloride becomes fully chemically reacted so that substantially all of it is in the form of hydrogen sulfide complex the mass may be regenerated simply by releasing the pressure, raising the temperature slightly, but at any event not higher than 200° F., and purging the hydrogen sulfide from the system; in a continuous operation the hydrogen sulfide absorber would be by-passed momentarily while this purging of the aluminum chloride mass was being carried out.

The invention is not limited to the use of any particular or specific type of feed stock except that the feed stock should predominate in normal paraffins of at least four carbon atoms per molecule, and preferably less than nine carbon atoms per molecule for best results. Thus, for example, normal butane, normal pentane, normal heptane, normal hexane, or mixtures of two or more of these, field butane, casinghead gasoline, straight run naphthas and the like, are all suitable feed stocks for use in connection with the present invention. As previously pointed out, however, these feed stocks in order to fully take advantage of the invention will contain some small amounts of impurities, principally sulfur-containing impurities, even though they have been previously subjected to a sulfur and sulfur compound removal pretreatment. The total sulfur content, either as sulfur or in organic combination, should of course be in minimum but the process has been successfully operated with concentrations of total sulfur of about 100 grains per thousand cubic feet of gaseous feed stock, which may be considered typical of feed stocks which are normally available for isomerization. It is probable that considerably higher concentrations could also be handled successfully.

The hydrogen chloride or other suitable hydrogen halide promoter is employed in amounts ranging between about 1% and about 22%, preferably between about 5% and about 10%, all percentages being by weight based on the feed, and the aluminum chloride is present in the reaction zone, particularly for vapor phase isomerization reactions, impregnated or sorbed on a carrier, the aluminum chloride constituting between about 6 and about 18 weight per cent of the carrier, preferably between about 8 and about 12 weight per cent of the carrier. This carrier should contain only tenaciously absorbed aluminum chloride and the carrier should preferably have been dried previously at a temperature considerably higher than the highest temperature to be encountered in the isomerization reaction so that it is substantially dehydrated and no further quantities of free water will be given off during the isomerization reaction. The impregnation of the carrier with the aluminum chloride may be in liquid phase as by the use of a solvent, or aluminum chloride vapors may be passed into the carrier mass under temperatures around that to be employed in the isomerization reaction, and then the mass may be purged by heating the same up to from 100 to 200° F. higher than that to be encountered in the reaction zone while passing through an inert gas to remove any loosely held aluminum chloride particles or vapors.

The temperature under which the isomerization reaction is carried out in the vapor phase is more or less well known. However, in general, it ranges between about 200° F. and 375° F. or as high as 400° F. depending on the particular feed stock employed. In the case of normal butane, the preferred temperature range is between 250° F. and 325° F. The pressures are usually adjusted so that they range between 100 and 450 pounds per square inch. For butane isomerization, these pressures are preferably between 150 and 300 pounds per square inch. The temperature maintained in the hydrogen sulfide removal unit when using aluminum chloride is usually between 0° F. and 75° F. lower than the lowest temperature maintained in the isomerization unit and product effluent stream before stripping. Where metallic copper is used as the removal agent for hydrogen sulfide in the hydrogen halide recycle stream, room temperature or slightly higher is satisfactory, although temperatures of 40–50° F. were employed for the hydrogen sulfide removal in a specific run wherein the metallic copper was maintained under a pressure of about 250 pounds per square inch with the stripper gas containing about 75% hydrogen chloride. The throughput of normal paraffinic feed stock through the isomerization unit may vary considerably, but for butane isomerization it ranges between about 0.5 and about 2 liquid volumes of feed stock per volume of catalyst per hour.

*Example*

A specific example of an operation embodying this invention is as follows:

A cylindrical vertical reaction chamber of approximately 3 inches in diameter was substantially filled with a catalyst composition made up as follows: Eleven pounds of Porocel which had been heated to about 1000° F. for about 5 hours in order to substantially dehydrate it and free it from any readily separable water was charged on top of about 1.5 lbs. of granular aluminum chloride in this reaction chamber. The mass was then heated to about 300° F. and a stream of butane was passed upwardly therethrough at atmospheric pressure for about 24 hours. The reaction chamber was then closed to the atmosphere and a feed stock containing about 6.6 volume per cent isobutane, about 93.1 volume per cent normal butane and about 0.3 volume per cent of $C_5$ and heavier paraffins, and which also contained, by analysis, 96 grains of sulfur and sulfur-containing impurities per thousand cubic feet of gas, was admixed with dry hydrogen chloride in an amount of about 6 weight per cent of hydrogen chloride based on the feed mixture and this mixture was then passed upwardly through the catalyst mass under a pressure of about 200 lbs./sq. in. and at a temperature of between about 250° F. and about 300° F. at a throughput of about 1 liquid volume of butane feed per volume of catalyst per hour. The effluent was withdrawn from the upper portion of the reaction chamber and was then passed to a stripping tower having a bottom temperature of between about 200° F. and about 215° F. and a top temperature of between about 40° F. and about 50° F., the entire tower being maintained under a pressure of about 250 lbs./sq. in. At the top of this tower a refrigerated condenser was inserted and the hydrogen chloride which passed overhead contacted the walls of this condenser. The surfaces of the condenser so exposed to the overhead gases had been sprayed with metallic copper, and hydrogen sulfide which came overhead with the hydrogen chloride was found to react with the metallic copper surface to such an extent as to be essentially completely removed from the recycle gas, as copper sulfide. In fact, as long as any appreciable amounts of unreacted surface of copper remained, the hydrogen sulfide concentration was kept sufficiently low so that precipitation of $AlCl_3$—$H_2S$ complexes in the isomerization unit proper was avoided. The process as above described was carried out continuously over a period of 650 hours and during the operation the yield of isobutane ranged between about 30% and 50% based on the normal butane charged, with an average yield of over 40%, with about 95% of the normal butane that reacted being isomerized to isobutane.

In the specification and annexed claims where mention is made of sulfur type impurities or some similar expression is used, it is intended that this expression be broad enough to cover not only the presence of elemental sulfur and hydrogen sulfide but also the presence of other naturally occurring organic sulfur compounds such as mercaptans, disulfides, thioethers and the like, either as present in feeds from natural sources or present as prepared synthetically during the various treating operations and from which suitable feed stocks for isomerization units originate in refinery operations. These organic sulfur compounds tend to be broken up by the isomerization catalyst, forming hydrogen sulfide.

Having thus fully described and illustrated the character of the invention, what is desired to be secured by Letters Patent is:

1. A process of isomerizing normal paraffin which comprises passing a feed stock predominantly composed of normal paraffin containing four carbon atoms per molecule and containing small amounts of sulfur-containing impurities in contact with aluminum chloride and in the presence of promotional amounts of hydrogen chloride, under isomerization reaction conditions, separating from the reacted mixture a mixture of hydrogen chloride together with small amounts of normally gaseous sulfur-containing constituents boiling below the boiling point of the normal paraffin feed, contacting said gaseous mixture with aluminum chloride to at least partially remove the sulfur-containing impurities as insoluble solid complexes with the aluminum chloride, and continuously returning the hydrogen chloride so treated to the isomerization reaction zone containing the aluminum chloride isomerization catalyst and feed stock.

2. A process of isomerizing normal paraffins which comprises passing a feed stock predominantly composed of normal paraffin containing four carbon atoms per molecule and containing small amounts of sulfur-containing impurities in contact with aluminum chloride and in the presence of promotional amounts of hydrogen chloride, under isomerization reaction conditions, separating from the reacted mixture a mixture of hydrogen chloride together with small amounts of normally gaseous sulfur-containing constituents boiling below the boiling point of the normal paraffin feed, contacting said gaseous mixture with metallic copper to at least partially remove sulfur-containing impurities as reaction products with metallic copper, and continuously returning the hydrogen chloride so treated to the isomerization reaction zone containing the aluminum chloride isomerization catalyst and feed stock.

3. A process of isomerizing normal paraffin having from four to nine carbon atoms per molecule which comprises continuously passing in vapor phase a feed stock predominantly composed of said normal paraffin and containing small amounts of hydrogen sulfide in contact with aluminum chloride and in the presence of promotional amounts of hydrogen chloride under isomerization reaction conditions, separating from the reacted mixture a mixture of hydrogen chloride together with small amounts of hydrogen sulfide contained in the reactor effluent, contacting the said gaseous mixture with aluminum chloride at a temperature lower than any temperature maintained in the isomerization zone and reacted mixture before separating the hydrogen sulfide and hydrogen chloride therefrom to at least partially remove the hydrogen sulfide as an insoluble complex with the aluminum chloride, and continuously returning the hydrogen chloride so treated to the isomerization reaction zone containing the aluminum chloride isomerization catalyst and feed stock.

4. A process of isomerizing normal paraffin having from four to nine carbon atoms per molecule which comprises continuously passing in vapor phase a feed stock predominantly composed of said normal paraffin and containing small amounts of hydrogen sulfide in contact with aluminum chloride and in the presence of promotional amounts of hydrogen chloride under isomerization reaction conditions, separating from the reacted mixture a mixture of hydrogen chloride together with small amounts of hydrogen sulfide contained in the reactor effluent, contacting the said gaseous mixture with metallic copper to at least partially remove the hydrogen sulfide from the hydrogen chloride, and continuously returning the hydrogen chloride so treated to the isomerization reaction zone containing the aluminum chloride isomerization catalyst and feed stock.

5. A process of continuously isomerizing normal butane in the vapor phase, said normal butane containing small amounts of sulfur type impurities, which comprises passing said feed stock in admixture with promotional amounts of hydrogen chloride through a catalyst bed of aluminum chloride sorbed in a porous carrier at a temperature of between about 250° F. and about 325° F., under a pressure of between about 150 and about 300 lbs./sq. in. at a throughput of between about 0.5 and about 2 v/v/hr., continuously passing the reacted effluent to a stripping operation wherein a mixture comprising substantially hydrogen chloride, hydrocarbons lighter than butane, and hydrogen sulfide contained in the reactor effluent is removed overhead at a temperature of between about 40° F. and about 110° F. while the normal butane and isobutane are removed from the bottom of the stripping tower for further processing, said tower being maintained under a pressure of about 250 lbs./sq. in., continuously passing the overhead gases from the stripping operation in contact with aluminum chloride at a temperature from 0° F. to 75° F. lower than any temperature maintained in the isomerization reaction zone and reacted mixture before separation of hydrogen sulfide and hydrogen chloride therefrom, and continuously recycling the hydrogen chloride gaseous mixture so treated back to the isomerization reaction zone in admixture with fresh feed stock.

6. A process as in claim 5 wherein normal pentane replaces normal butane as the feed stock and wherein the reaction conditions are correlated to give isopentane as the predominant final product, the reaction temperature being somewhat lower than 250° F.

7. A process of continuously isomerizing normal butane in the vapor phase, said normal butane containing small amounts of sulfur type impurities, which comprises passing said feed stock in admixture with promotional amounts of hydrogen chloride through a catalyst bed of aluminum chloride sorbed in a porous carrier at a temperature of between about 250° F. and about 325° F., under a pressure of between about 150 and about 300 lbs./sq. in. at a throughput of between about 0.5 and about 2 v/v/hr., continuously passing the reacted effluent to a stripping operation wherein a mixture comprising substantially all of the hydrogen chloride and hydrogen sulfide contained in the reactor effluent is removed overhead at a temperature of between about 40° F. and about 110° F. while the normal butane and isobutane are removed from the bottom of the stripping tower for further processing, said tower being maintained under a pressure of about 250 lbs./sq. in., continuously passing the overhead gases from the stripping operation in contact with metallic copper, and continuously recycling the hydrogen chloride gaseous mixture so treated back to the isomerization reaction zone in admixture with fresh feed stock.

STEPHEN F. PERRY.